United States Patent
Tang et al.

(10) Patent No.: US 9,393,668 B2
(45) Date of Patent: Jul. 19, 2016

(54) POLISHING HEAD WITH ALIGNMENT GEAR

(75) Inventors: Pei Tang, Hsin-Chu (TW); Kun-Tai Wu, Hsin-Chu (TW)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 860 days.

(21) Appl. No.: 13/547,232

(22) Filed: Jul. 12, 2012

(65) Prior Publication Data

US 2014/0017981 A1   Jan. 16, 2014

(51) Int. Cl.
*B24B 47/10* (2006.01)
*B24B 47/22* (2006.01)
*F16D 11/00* (2006.01)
*B24B 37/00* (2012.01)

(52) U.S. Cl.
CPC ............ *B24B 47/22* (2013.01); *B24B 37/00* (2013.01); *F16D 11/00* (2013.01)

(58) Field of Classification Search
CPC ....... B24B 37/30; F16D 11/00; F16D 11/002; F16D 11/16; F16D 25/046
USPC ......... 451/388, 398; 192/85.03, 85.04, 85.16, 192/85.18
See application file for complete search history.

(56) References Cited

U.S. PATENT DOCUMENTS

| | | | | |
|---|---|---|---|---|
| 5,964,653 | A * | 10/1999 | Perlov et al. | 451/288 |
| 6,056,632 | A * | 5/2000 | Mitchel et al. | 451/288 |
| 6,273,804 | B1 * | 8/2001 | Numoto | 451/288 |
| 6,422,927 | B1 * | 7/2002 | Zuniga | 451/288 |
| 6,511,367 | B2 * | 1/2003 | Zuniga et al. | 451/285 |
| 6,645,057 | B2 * | 11/2003 | Quek | 451/287 |
| 7,210,991 | B1 * | 5/2007 | Van Der Ve | 451/285 |
| 2006/0185957 | A1 * | 8/2006 | Kimes | F16D 41/12 192/46 |
| 2006/0245138 | A1 * | 11/2006 | Koh | B24B 37/30 361/234 |
| 2008/0014842 | A1 | 1/2008 | Berkstresser et al. | |
| 2012/0125137 | A1 * | 5/2012 | Maupin | F16D 11/14 74/490.07 |

OTHER PUBLICATIONS

"Sustainable CMP", posted Jul. 30, 2009, Retrieved May 24, 2012, pp. 1-4, http://www.bing.com/videos/search?q=cmp+semiconductor+video&mid=02DEC1100D60F066789F02DEC1100D60F066789F&view=detail&FORM=VIRE1.

"Chemical-mechanical planarization" Retrieved May 24, 2012, pp. 1-3, http://en.wikipedia.org/wiki/Chemical-mechanical_planarization.

* cited by examiner

*Primary Examiner* — Joseph J Hail
*Assistant Examiner* — Henry Hong
(74) *Attorney, Agent, or Firm* — Cooper Legal Group, LLC (57) ABSTRACT

Among other things, one or more techniques and/or systems are provided for driving a body of a polishing head using an alignment gear. That is, an alignment gear, coupled to a housing of the polishing head, can transfer rotational force from the housing to the body responsive to the alignment gear being mated with a channel associated with the body. For example, the housing can supply pressure to the body, resulting in the body and the housing moving towards one another into a mated state. When the body and the housing are in the mated state, the alignment gear can mate with the channel (e.g., the alignment gear can fit within the channel). In this way, the alignment gear can drive the body by transferring rotational force to the body, resulting in the body rotating a semiconductor wafer against a polishing pad to polish the semiconductor wafer, for example.

20 Claims, 8 Drawing Sheets

POLISHING HEAD WITH ALIGNMENT GEAR

BACKGROUND

During fabrication of semiconductor devices on a semiconductor wafer, chemical mechanical polishing can be performed to smooth surfaces of the semiconductor wafer using chemicals and/or mechanical forces. For example, the semiconductor wafer can be polished to prepare the semiconductor wafer for a new layer of material. In one example of polishing, the semiconductor wafer can be secured to a polishing head configured to hold and rotate the semiconductor wafer (e.g., vacuum pressure can be used to secure the semiconductor wafer to the polishing head). The polishing head can apply force to the semiconductor wafer toward a polishing pad during polishing. The polishing head can rotate the semiconductor wafer against the polishing pad, which can also be rotating, to apply mechanical force to the semiconductor wafer to remove material and/or even out irregular topography of the semiconductor wafer, for example. In one example, chemicals, such as slurry (e.g., colloid), can be applied to the polishing pad during polishing to serve as solvents which aid in reducing non-uniformities on the surface of the semiconductor wafer.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for driving a body of a polishing head are provided herein. A polishing head can be configured to polish a semiconductor wafer to smooth the semiconductor wafer by removing material from the semiconductor wafer using chemicals and/or mechanical forces. The polishing head can comprise a housing, a rolling seal, a body, and/or other components. The housing can supply pressure to the body through one or more pressure tubes connected from the housing to the body to secure the semiconductor wafer to the body. When the body is in the pressurized state, the body can apply force to the semiconductor wafer towards a polishing pad. The rolling seal can maintain the pressure within the body by providing a seal between the body and the housing (e.g., when the body is rotating the semiconductor wafer against the polishing pad during polishing).

Rotational force can be applied to the housing to rotate the body, which in turn rotates the semiconductor wafer secured to the body. Conventional techniques transfer the rotational force from the housing through the rolling seal to the body. In this way, the body, rotating based upon the rotational force transferred through the rolling seal, can rotate the semiconductor wafer against the polishing pad during polishing. Unfortunately, the rolling seal (e.g., a rubber seal) can fail due to, among other things, sheer stress resulting from the rolling seal overcoming inertia of the body during transfer of the rotational force and/or from forces applied to the body (through the semiconductor wafer) from the polishing pad during polishing. As provided herein, an alignment gear arrangement can be used to drive the body of the polishing head, or rather to transfer rotational force from the housing to the body. The alignment gear arrangement can comprise one or more alignment gears coupled to the housing of the polishing head. When the semiconductor wafer is secured to the polishing head (e.g., when the body is in the pressurized state for polishing), the body of the polishing head can mate with an alignment gear. For example, pressure supplied to the body can result in the body and the housing moving towards one another, such that the alignment gear can mate with a first channel of the body (e.g., the alignment gear can fit into the first channel). In this way, rotational force can be transferred from the housing, through the alignment gear, to the body. Driving the body using the alignment gear can mitigate sheer stress on the rolling seal that can otherwise occur when merely the rolling seal is used to drive the body or transfer rotational force from the housing to the body.

To the accomplishment of the foregoing and related ends, the following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Figure 1:
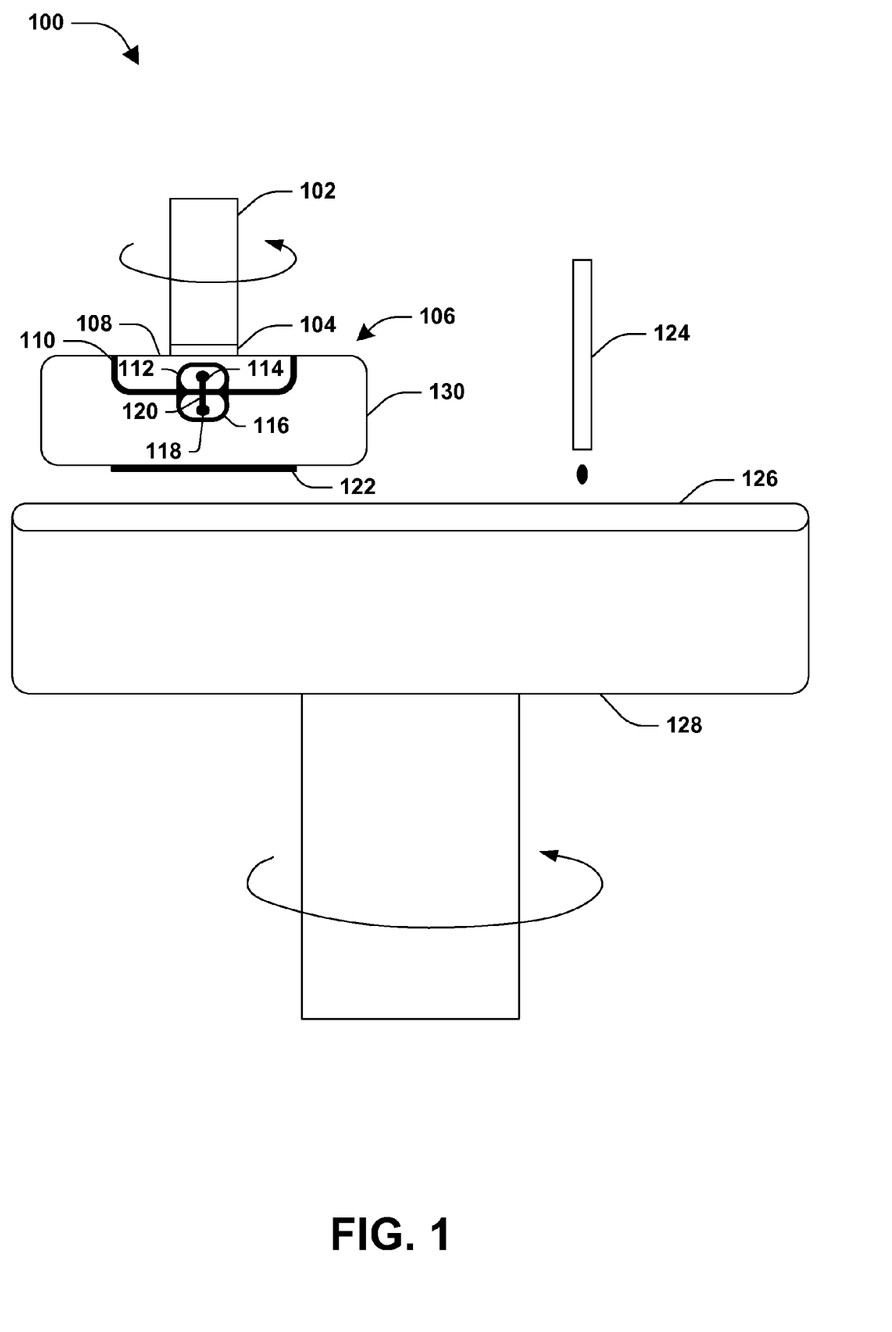
FIG. 1 is an illustration of an example of a polishing head configured to polish a semiconductor wafer.

FIG. 1 illustrates an example 100 of a polishing head 106 configured to polish a semiconductor wafer 122. The polishing head 106 can comprise a housing 108. The housing 108 can be configured to supply pressure to a body 130 of the polishing head 106. For example, the housing 108 can supply pressure to the body 130 through a pressure tube 120. The pressure tube 120 can be connected to the body 130 through a first connector 118 situated within a first channel 116 of the body 130, and can be connected to the housing 108 through a second connector 114 situated within a second channel 112 of the housing 108. In this way, the housing 108 can pressurize the body 130 into a pressurized state. When the body 130 is in the pressurized state, the body 130 can secure the semiconductor wafer 122 to the body (e.g., via vacuum) and can apply force to the semiconductor wafer 122 towards a polishing pad 126. A rolling seal 110 can be situated between the housing 108 and the body 130 to maintain (e.g., the vacuum) pressure within the body 130.

A drive shaft 102 can apply rotational force, through a spindle 104, to the housing 108 to rotate the housing 108. The rotational force can be transferred from the housing 108, through the rolling seal 110, to the body 130, such that the body 130 can rotate the semiconductor wafer 122 (which is (e.g., vacuum) secured to the body) against the polishing pad 126. In this way, the rolling seal 110 can drive the body 130 during polishing of the semiconductor wafer 122. During polishing, a plate 128 can rotate the polishing pad 126 against the semiconductor 122. In this way, the rotational movement of the polishing pad 126 against the rotating semiconductor wafer 122 can result in mechanical force that can smooth the surface of the semiconductor 122 by removing material and/or evening out irregular topography of the semiconductor wafer 122. Slurry 124 can be added to the polishing pad 126 to aid in polishing (e.g., to act as a solvent).

When the rolling seal 110 transfers rotational force from the housing 108 to the body 130, a counterforce can be exerted upon the rolling seal 110 due to the inertia of the body 130 and/or the rotational movement of the polishing pad 126. The counterforce can result in, among other things, sheer stress on the rolling seal 110, which can result in failure of the rolling seal 110 (e.g., the rolling seal 110 can comprise a rubber material that can tear, detach, fracture, break, etc. over time as a result of the sheer stress). If the rolling seal 110 fails, chemicals (e.g., As, P, In hydride, oxide, and/or other byproducts) can leak into components resulting in cross contamination. Additionally, replacement of the rolling seal 110 can result is significant downtime for the polishing head 106.

Figure 2:
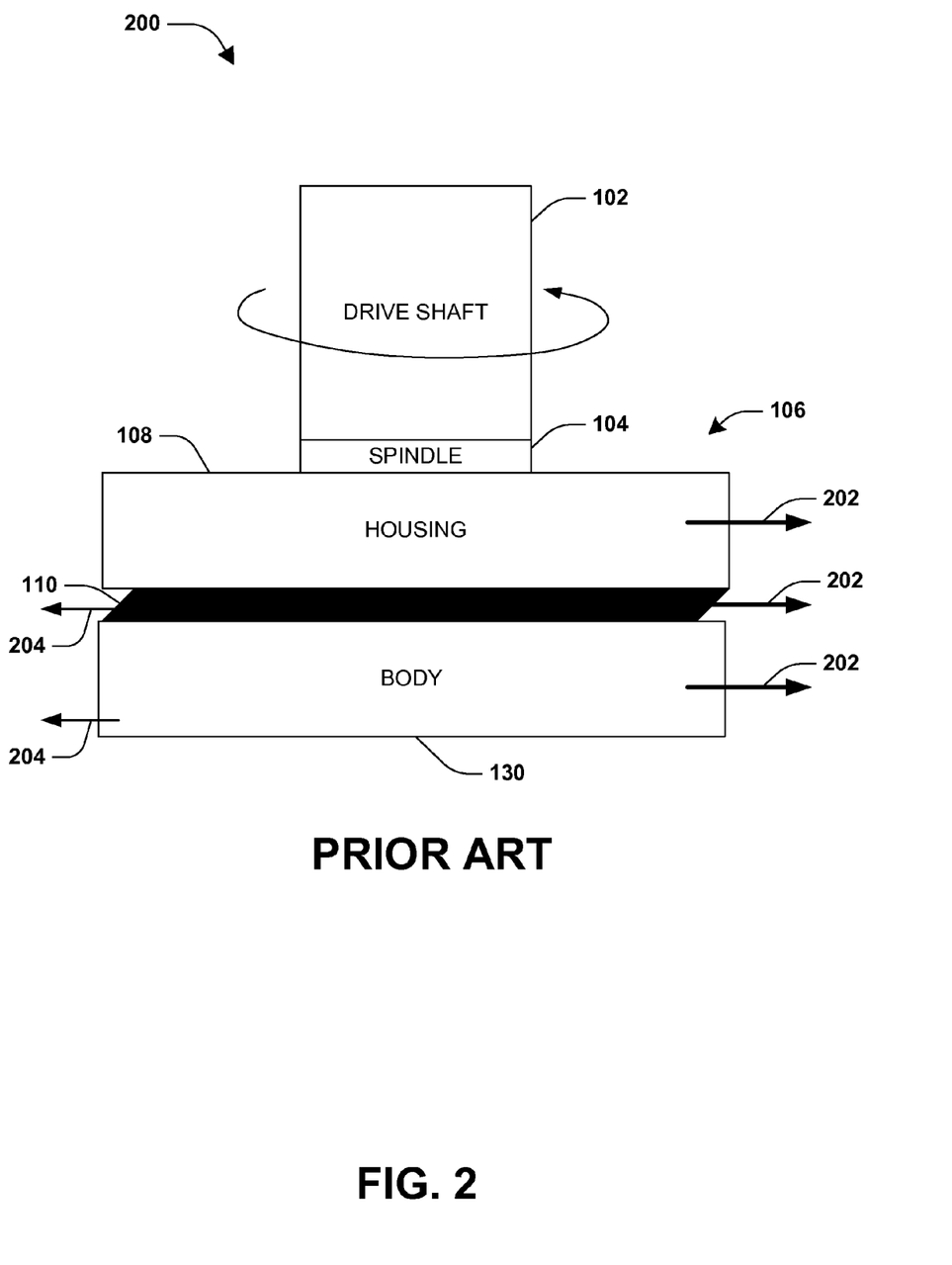
FIG. 2 is an illustration of an example of sheer stress applied to a rolling seal during transfer of rotational force from a housing of a polishing head, through the rolling seal, to a body of the polishing head.

FIG. 2 illustrates an example 200 of sheer stress applied to a rolling seal 110 during transfer of rotational force 202 from a housing 108 of a polishing head 106, through the rolling seal 110, to a body 130 of the polishing head 106. A drive shaft 102 can be configured to transfer rotational force 202 through a spindle 104 to the housing 108 to rotate the housing 108. The rolling seal 110 can be positioned between the housing 108 and the body 130 of the polishing head 106. The rolling seal 110 can transfer the rotational force 202 from the housing 108 to the body 130. Inertia of the body 130 can result in a counterforce 204 on the rolling seal 110. The counterforce 204 can create sheer stress on the rolling seal 110, which can result in failure of the rolling seal 110 over time (e.g., the rolling seal 110 can comprise a rubber material susceptible to sheer stress).

When the rolling seal 110 fails, pressure within the body 130 can be lost. The loss of pressure can allow containments to leak into various components of the polishing head 106 and/or other components of a polishing device comprising the polishing head 106, and may also inhibit the ability of the polishing head 106 to secure the semiconductor wafer to the body 130. Maintenance and troubleshooting of the rolling seal 110 can result in significant downtime for the polishing head 106, which can impact productivity. Accordingly, as provided herein, an alignment gear arrangement comprising one or more alignment gears coupled to the housing 108 can be configured to mate with the body 130 (e.g., when the body 130 is in a pressurized state), such that the one or more alignment gears can transfer the rotational force 202 from the housing 108 to the body 130 to reduce sheer and/or other type(s) of stress on the rolling seal 110.

Figure 3:
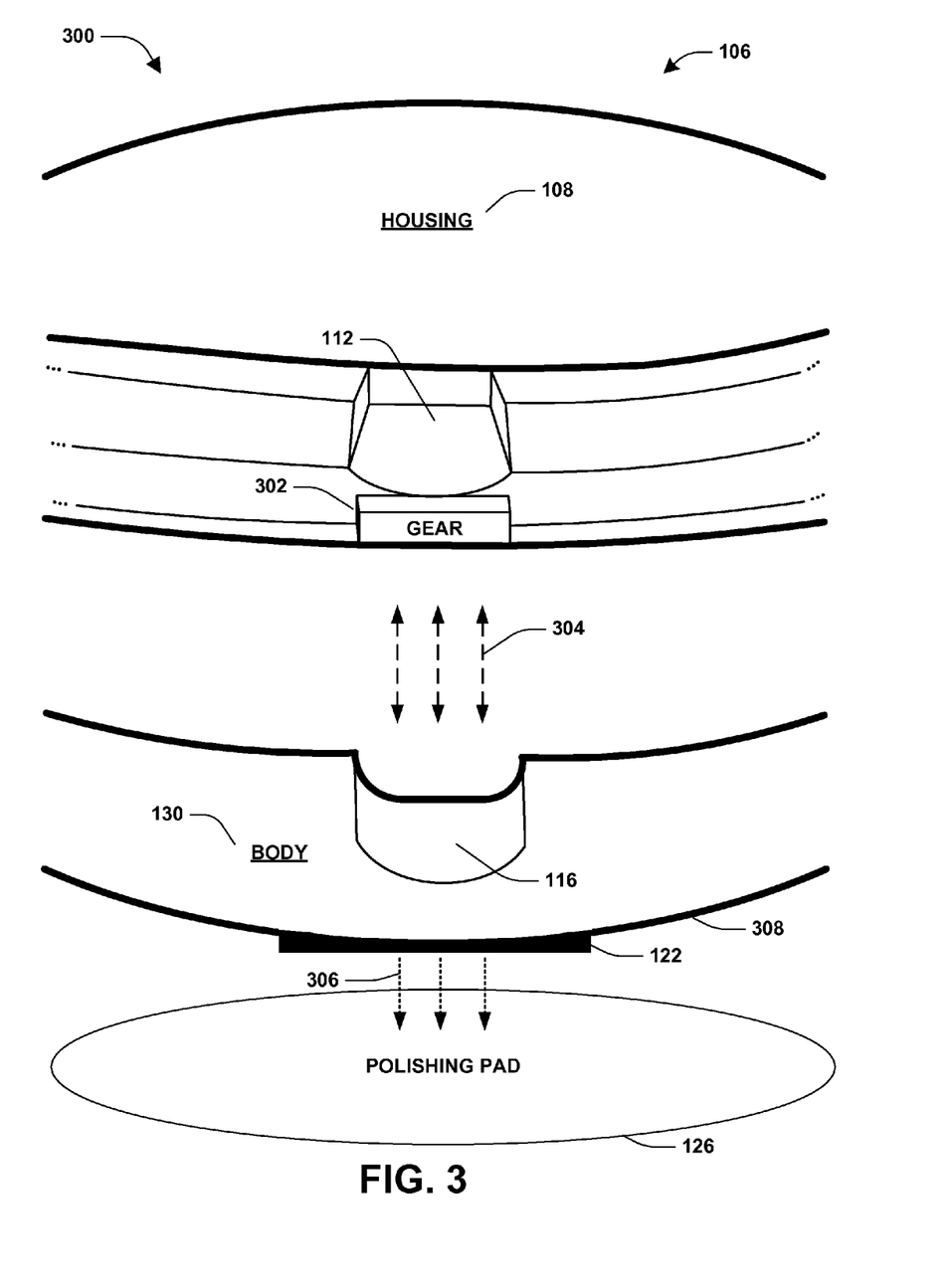
FIG. 3 is an illustration of an example of a side view of a polishing head in a non-pressurized state.
Figure 4:
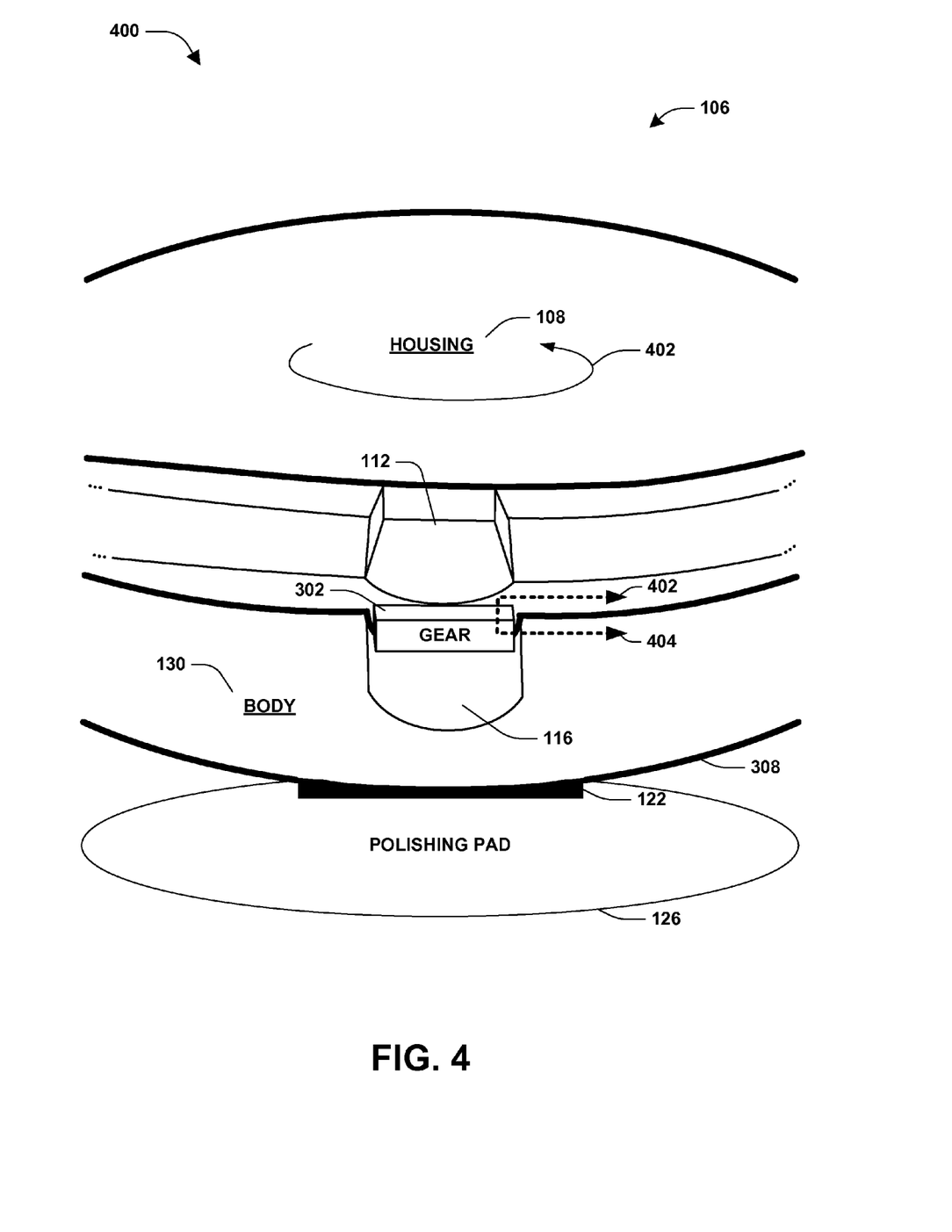
FIG. 4 is an illustration of an example of a side view of a polishing head in a pressurized state.

FIG. 3 illustrates an example 300 of a side view of a polishing head 106 in a non-pressurized state. The polishing head 106 can comprise a housing 108 and a body 130. The housing 108 can be configured to supply pressure to the body 130, resulting in the body 130 being in a pressurized state (e.g., the housing 108 can supply pressure through a pressure tube 120 that is connected to the body 130 through a first connector 118 within a first channel 116 of the body 130 and connected to the housing 108 through a second connector 114 within a second channel 112 of the housing 108, as illustrated in FIG. 1). When the body 130 is in a pressurized state, a semiconductor wafer 122 can be secured to the body 130 (e.g., against a retaining ring 308 coupled to the body 130). During polishing, the body 130, in the pressurized state, can apply a force 306 to the semiconductor wafer 122 towards a polishing pad 126, such that at least a portion of the semiconductor wafer 122 physically contacts the polishing pad 126. In this way, the polishing pad 126 can remove material and/or smooth a surface of the semiconductor wafer 122. It may be appreciated that an example of the polishing head 106 in a pressurized state is illustrated in FIG. 4.

Rotational force can be applied to the housing 108 in order to rotate the housing 108. The rotational force can be transferred from the housing 108 to the body 130 in order to rotate the semiconductor wafer 122, secured to the body 130, against the polishing pad 126 during polishing (e.g., where the polishing pad 126 may be independently rotating as well). A rolling seal 110, not illustrated in FIG. 3, can be configured to maintain the pressurized state of the body 130 so that the semiconductor wafer 122 can remain secured to the body 130. If the rolling seal 110 is used to transfer the rotational force from the housing 108 to the body 130 in order to drive the body 130, then sheer stress (e.g., resulting from inertia of the body 130 and/or rotational movement of the polishing pad 126) can cause wear and/or failure of the rolling seal 110.

As provided herein, an alignment gear 302 coupled to the housing 108 can efficiently transfer the rotational force from the housing 108 to the body 130. In one example, the alignment gear 302 and the housing 108 can be configured as a unibody (e.g., integral, single component). In another example, the alignment gear 302 can be attached to the housing 108 as a separate component. The alignment gear 302 can be configured to transfer rotational force from the housing 108 to the body 130 based upon the alignment gear 302 being mated with (e.g., recessed within) the first channel 116 associated with the body 130. For example, the alignment gear 302 can mate with the first channel 116 responsive to the body 130 being in a pressurized state (e.g., pressurizing the body 130 can result in the body 130 and the housing 108 moving 304 towards one another, such that the alignment gear 302 mates with the first channel 116, as illustrated in FIG. 4). The alignment gear 302 can be sized proportional to the first channel 116, such that the alignment gear 302 can mate (e.g., fit within) the first channel 116 (e.g., if the first channel 116 is about 1.5 cm wide or wider and is about 0.5 cm deep or deeper, then the alignment gear 302 can be about 1.5 cm wide and can protrude out from the housing 108 by about 0.5 cm, for example). In this way, the alignment gear 302 can transfer rotational force from the housing 108 to the body 130 in order to rotate the body 130, which can result in the body 130 rotating the semiconductor wafer 122 against the polishing pad 126. The alignment gear 302 can be un-matted from the first channel 116 responsive to the body 130 being in a non-pressurized state, as illustrated in example 300.

In one example, a rolling seal clamp 502, not illustrated in FIG. 3, can be attached to the body 130 (e.g., the rolling seal clamp 502 can be configured as shroud that covers the body 130). The rolling seal clamp 502 can comprise the first channel 116 that is associated with the body 130. In this way, the alignment gear 302 can mate with the first channel 116 of the rolling seal clamp 502 in order to transfer rotational force from the housing 108, through the rolling seal clamp 502, to the body 130.

FIG. 4 illustrates an example 400 of a side view of a polishing head 106 in a pressurized state. The polishing head 106 can comprise a housing 108 and a body 130. The housing 108 can be configured to supply pressure to the body 130, resulting in the body 130 being in a pressurized state. When the body 130 is in the pressurized state, a semiconductor wafer 122 can be secured to the body 130 (e.g., against a retaining ring 308 coupled to the body 130), and the body 130 can apply a force 306 to the semiconductor wafer 122 towards a polishing pad 126 to polish the semiconductor wafer 122 (e.g., the polishing pad 126 can be rotated against the semiconductor wafer 122 during polishing to remove material and/or smooth surfaces of the semiconductor wafer 122). When the body 130 is in a non-pressurized state, the body 130 and the housing 108 can be separated from one another. It may be appreciated that an example of the polishing head 106 in a non-pressurized state, where the body 130 and the housing 108 are separated, is illustrated in FIG. 3.

An alignment gear 302 can be coupled to the housing 108 (e.g., as a unibody or as a separate component). For example, the alignment gear 302 can be positioned between a second channel 112 of the housing 108 and a first channel 116 of the body 130. The alignment gear 302 can be positioned to mate with (e.g., first within) the first channel 116 of the body 130 during securement of the semiconductor wafer 122 to the body 130 (e.g., when the body 130 is in a pressurized state). For example, when pressure is supplied from the housing 108 to the body 130, the housing 108 and body 130 can move 304 towards one another, resulting in the alignment gear 302 matting with the first channel 116. The alignment gear 302 can transfer rotational force 402 from the housing 108 to the body 130 based upon the alignment gear 302 being mated with the first channel 116. In this way, the alignment gear 302 can drive 404 the body 130, and thus rotate the semiconductor wafer 122 against the polishing pad 126 during polishing. The alignment gear 302 can comprise a variety of materials, such as polymers and/or metals, etc. (e.g., a material that can withstand sheer stress resulting from the alignment gear 302 overcoming inertia of the body 130 when transferring rotational force from the housing 108 to the body 130 and/or that can withstand counterforces applied by the (separately rotating) polishing pad 126).

Figure 5:
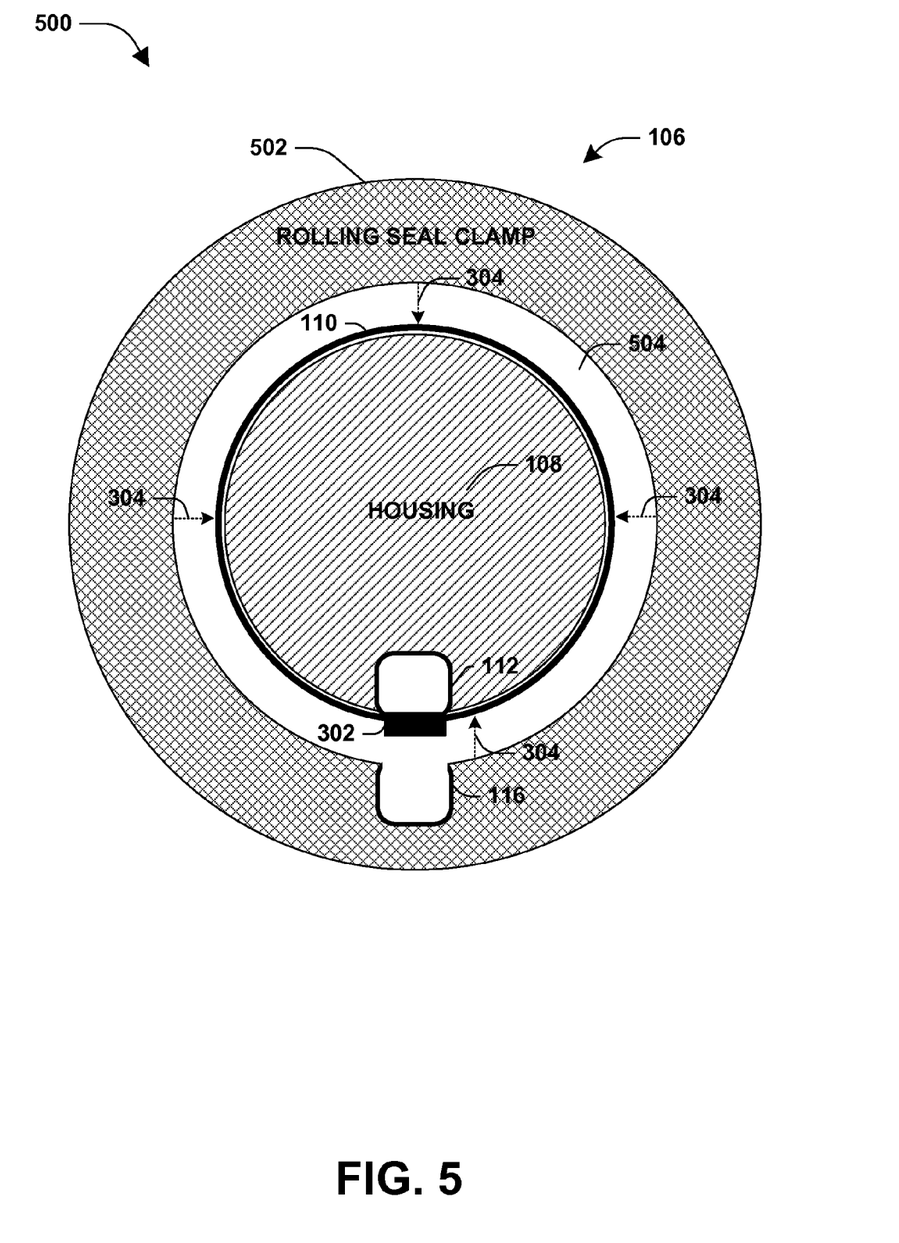
FIG. 5 is an illustration of an example of a top down view of an alignment gear arrangement for driving a rolling seal clamp of a polishing head when a body of the polishing head is in a non-pressurized state.

FIG. 5 illustrates an example 500 of a top down view of an alignment gear arrangement for driving a rolling seal clamp 502 of a polishing head 106 when a body 130 (not illustrated in FIG. 5) of the polishing head 106 is in a non-pressurized state. The polishing head 106 can comprise a housing 108, the body 130, the rolling seal clamp 502, a rolling seal 110, and/or other components. The housing 108 can be configured to supply pressure to the body 130 such that, among other things, a semiconductor wafer 122 (not illustrated in FIG. 5) can be secured to the body 130. The body 130 can be configured to apply force (e.g., 306 in FIG. 3) to the semiconductor wafer 122 towards a polishing pad 126 (not illustrated in FIG. 5) and/or rotate the semiconductor wafer 122 against the polishing pad 126 (e.g., a rotating polishing pad) to polish the semiconductor wafer 122. In one example, the body 130 can be positioned against the rolling seal clamp 502 (e.g., the rolling seal clamp 502 can be configured as a shroud that covers the body 130). The rolling seal 110 (e.g., a rubber ring) can be positioned between the housing 108 and the body 130. The rolling seal 110 can provide a seal between the housing 108 and the body 130, such that the body 130 can maintain a pressurized state from pressure supplied by the housing 108 to the body 130. The rolling seal clamp 502 can be configured to clamp the rolling seal 110 to the body 130.

Figure 6:
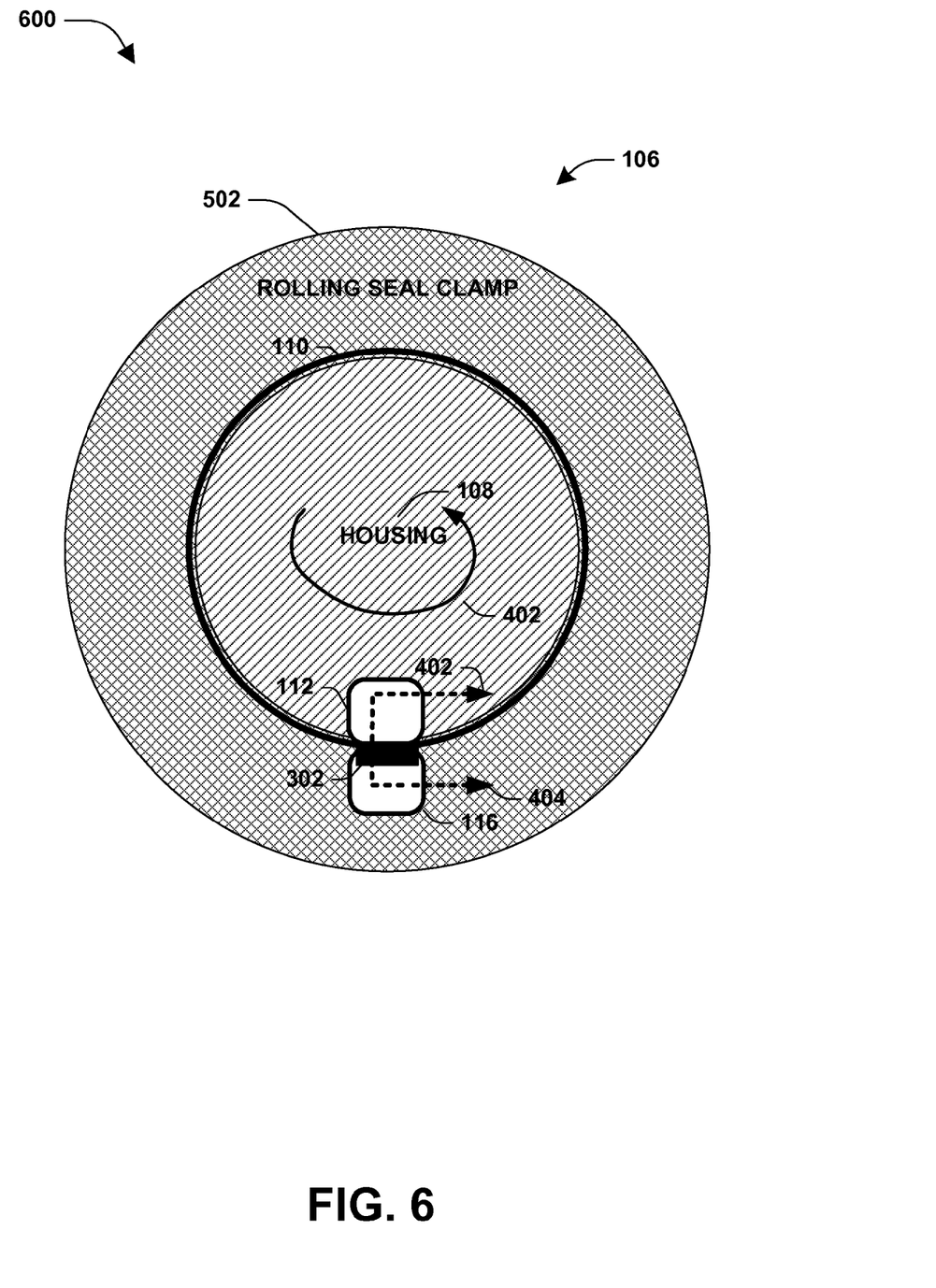
FIG. 6 is an illustration of an example of a top down view of an alignment gear arrangement for driving a rolling seal clamp of a polishing head when a body of the polishing head is in a pressurized state.

An alignment gear 302 can be coupled to the housing 108 according to an alignment gear arrangement. In one example, the alignment gear 302 can be positioned between a first channel 116 of the rolling seal clamp 502 and a second channel 112 of the housing 108. The alignment gear 302 can be positioned and dimensioned to mate with the first channel 116 of the rolling seal clamp 502 during securement of the semiconductor wafer to the polishing head 106 (e.g., when the body 130 is in a pressurized state). For example, the housing 108 and the rolling seal clamp 502 can move 304 towards one another when the body 130 is in the pressurized state, resulting in the alignment gear 302 mating (e.g., fitting within) the first channel 116. When the alignment gear 302 is mated with the first channel 116 (e.g., as illustrated in FIG. 6), the alignment gear 302 can transfer rotational force from the housing 108, through the rolling seal clamp 502, to the body 130. In this way, the alignment gear 302 can drive the body 130 to rotate the semiconductor wafer 122 (which is secured to the body 130) against a polishing pad 126 during polishing.

In one example, when the body 130 is in a non-pressurized state, the rolling seal clamp 502 and the housing 108 can be in an unmated state, thus resulting in a gap 504 between the rolling seal clamp 502 and the housing 108. When the rolling seal clamp 502 and the housing 108 are in the unmated state, the alignment gear 302 can be un-mated from the first channel 116, as illustrated in example 500 of FIG. 5.

FIG. 6 illustrates an example 600 of a top down view of an alignment gear arrangement for driving a rolling seal clamp 502 of a polishing head 106 when a body 130 (not illustrated in FIG. 6) of the polishing head 106 is in a pressurized state. The polishing head 106 can comprise a housing 108, the rolling seal clamp 502, the body 130, a rolling seal 110, and/or other components. The housing 108 can be configured to supply pressure to the body 130. The rolling seal 110 can maintain pressure within the body 130 when the body 130 is in the pressurized state. The rolling seal clamp 502 can be positioned over the body 130, and can clamp the rolling seal 110 to the body 130.

In one example, the body 130 can be in the pressurized state based upon pressure supplied by the housing 108 (e.g., the body 130 may have previously been in an unpressurized state, as illustrated in FIG. 5, such that the rolling seal clamp 502 and the housing 108 were separated, resulting in a gap 504). The pressure supplied to the body 130 can result in the housing 108 and the rolling seal clamp 502 moving (e.g., 304 in FIGS. 3 and 5) towards one another, resulting in the housing 108 and the rolling seal clamp 502 being in a mated state (e.g., without gap 504). In this way, an alignment gear 302, coupled to the housing 108 based upon an alignment gear arrangement, can mate with a first channel 116 of the rolling seal clamp 502 (e.g., the alignment gear 302 can be positioned below a second channel 112 of the housing 108 and protrude from a perimeter surface of the housing 108, such that the alignment gear 302 can mate with the first channel 116 when the body 130 is in the pressurized state).

Rotational force 402 can be applied to the housing 108 to rotate the housing 108 (e.g., during polishing to rotate a semiconductor wafer 122, secured to the body 130). Because the alignment gear 302 is mated with the rolling seal clamp 502, the alignment gear 302 can transfer the rotational force 402 from the housing, through the rolling seal clamp 502, to the body 130. In this way, the alignment gear 302 can drive 404 the body 130, and thus rotate the semiconductor wafer 122 (which is secured to the body 130) against a polishing pad 126 during polishing, for example.

Figure 7:
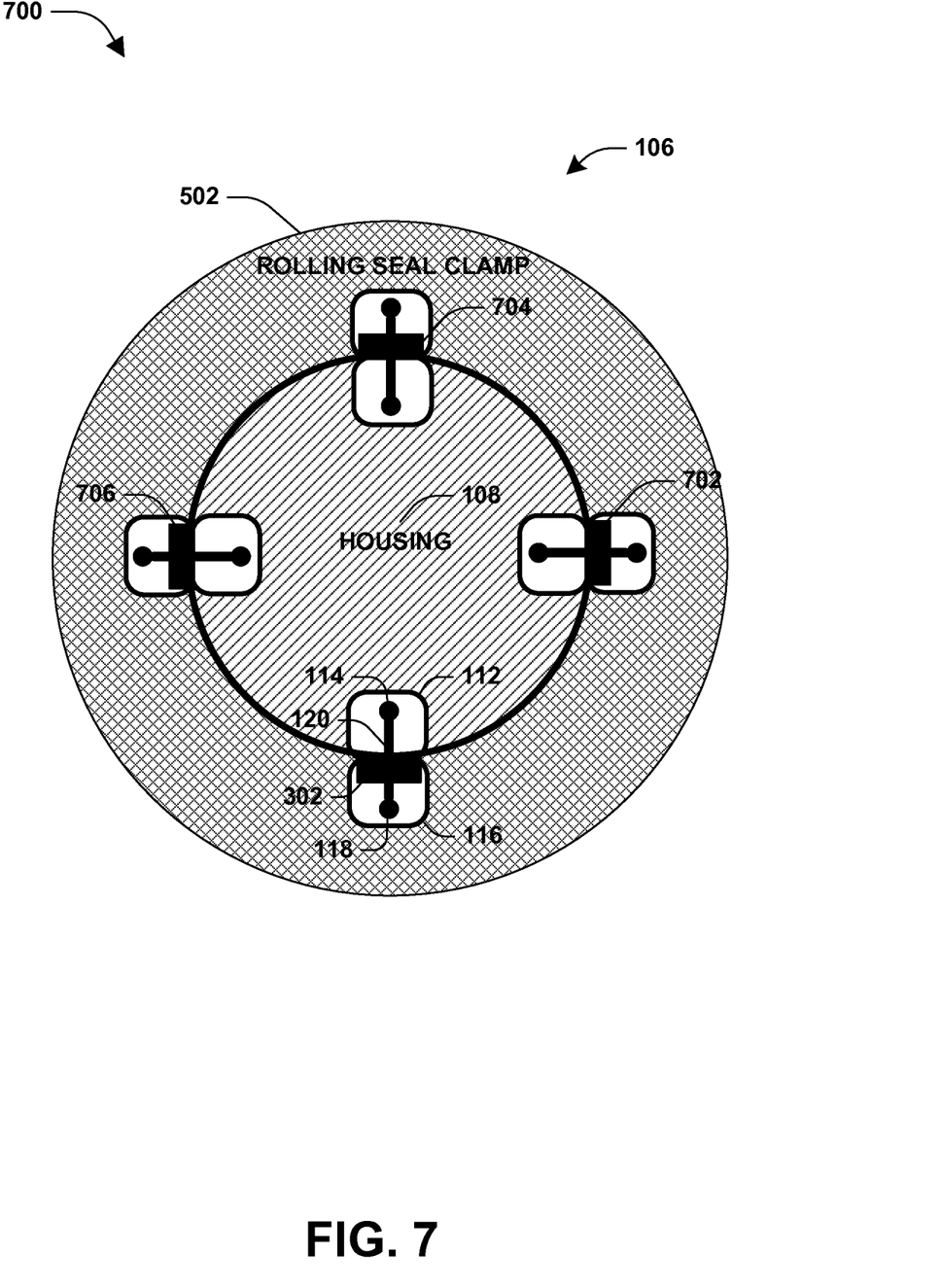
FIG. 7 is an illustration of an example of an alignment gear arrangement for driving a rolling seal clamp of a polishing head.

FIG. 7 illustrates an example 700 of an alignment gear arrangement for driving a rolling seal clamp 502 of a polishing head 106. The polishing head 106 can comprise a housing 108, the rolling seal clamp 502, a rolling seal 110 (not illustrated in FIG. 7), a body 130 (not illustrated in FIG. 7), and/or other components. The rolling seal clamp 502 can be positioned against the body 130 in order to clamp the body 130 against the rolling seal 110 (e.g., the rolling seal clamp 502 can comprise a shroud that covers the body 130). The alignment gear arrangement can comprise a first alignment gear 302, a second alignment gear 702, a third alignment gear 704, a fourth alignment gear 706, and/or other alignment gears not illustrated. The alignment gears can be coupled to the housing 108, such that when the body 130 of the polishing head 106 is in the pressurized state, the alignments gears can mate with channels comprised within the rolling seal clamp 502.

In one example, the housing 108 can supply pressure to the body 130, resulting in the body 130 being in a pressurized state. For example, a first connector 118 can be situated within a first channel 116 of the rolling seal clamp 502, and a second connector 114 can be situated within a second channel 112 of the housing 108. A pressure tube 120 can connect to the housing 108 through the second connector 114, and can connect to the rolling seal clamp 502 and through to the body 130 through the first connector 118. The housing 108 can supply pressure to the body 130 through the pressure tube 120 and/or other pressure tubes. When the body 130 is in the pressurized state, the rolling seal clamp 502 and the housing 108 can move (e.g., 304 in FIGS. 3 and 5) towards one another, resulting in the rolling seal clamp 502 and the housing 108 being in a mated state. When the rolling seal clamp 502 and the housing are in the mated state, the first alignment gear 302, the second alignment gear 702, the third alignment gear 704, and/or the fourth alignment gear 706 can mate with channels of the rolling seal clamp 502 (e.g., alignment gear 302 can mate with the first channel 116). The mated alignment gears can transfer rotational force from the housing 108, through the rolling seal clamp 502, to the body 130. In this way, driving the body 130 using the mated alignment gears (e.g., as opposed to merely using the rolling seal 110), can, among other things, mitigate sheer stress on the rolling seal 110 (e.g., such as where merely the rolling seal 110 is used to drive the body 130).

One embodiment of driving a body of a polishing head using an alignment gear is illustrated by an exemplary method 800. At 802, the method starts. At 804, the alignment gear, coupled to a housing of the polishing head, can be mated with a first channel associated with the body of the polishing head responsive to the body being in a pressurized state. It may be appreciated that examples of the body being in a pressurized state are illustrated in FIGS. 4, 6, and 7. In one example, pressure can be provided to the body (e.g., by the housing) to mate the alignment gear with the first channel.

Figure 8:
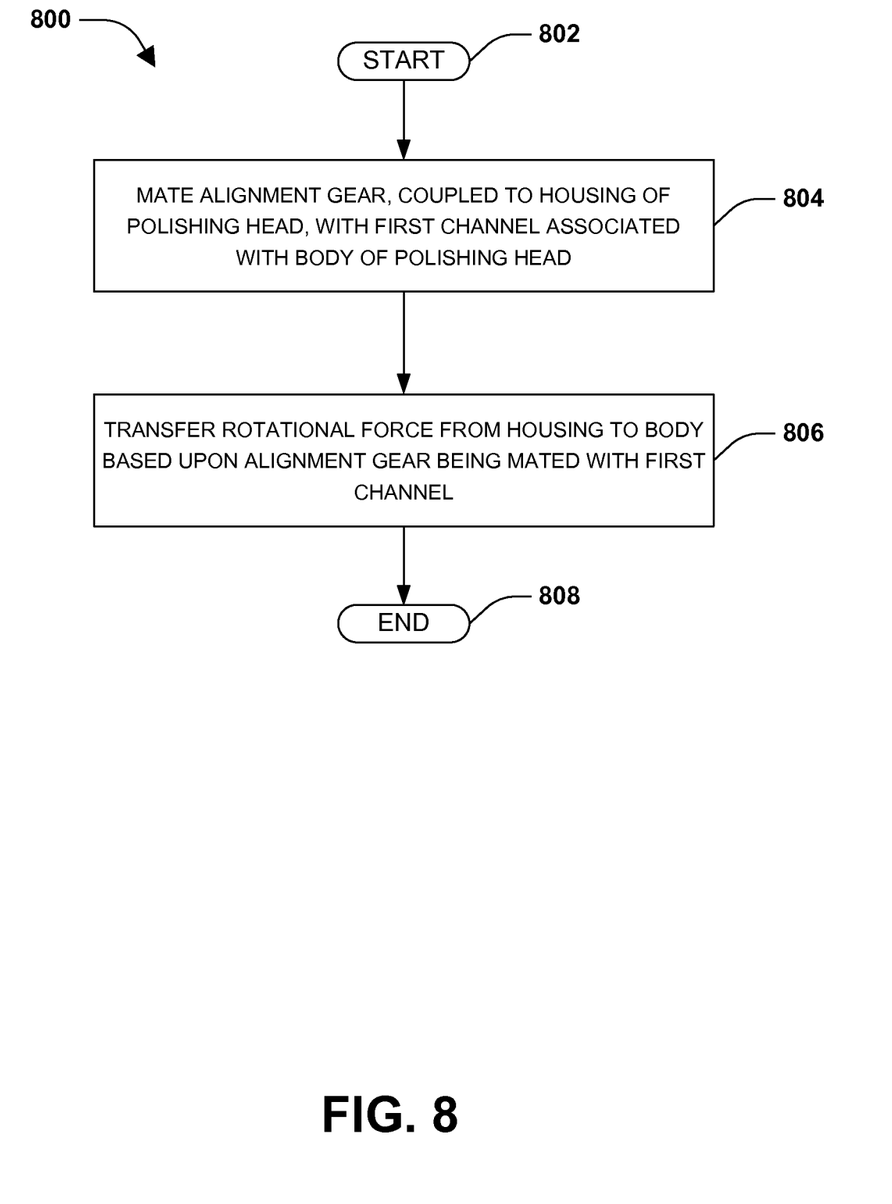
FIG. 8 is a flow diagram illustrating an example method of driving a body of a polishing head using an alignment gear.

At 806, rotational force can be transferred from the housing to the body based upon the alignment gear being mated with the first channel. For example, the alignment gear can transfer the rotational force from the housing to the body, resulting in the body rotating a semiconductor wafer (which is secured to the body) against a polishing pad during polishing (e.g., chemical mechanical polishing). A force can be applied to the semiconductor wafer towards the polishing pad, such that the polishing pad can remove material and/or irregularities on a surface of the semiconductor wafer. In this way, the alignment gear can drive the body of the polishing head during polishing of the semiconductor wafer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in herein "or" is intended to mean an inclusive "or" rather than an exclusive "or". In addition, the articles "a" and "an" as used herein may generally be construed to mean "one or more" unless specified otherwise or clear from context to be directed to a singular form. Also, at least one of A and B and/or the like generally means A or B or both A and B.

Also, although the application has been shown and described with respect to one or more implementations, equivalent alterations and modifications will occur to others skilled in the art based upon a reading and understanding of this specification and the annexed drawings. The application includes all such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the application. In addition, while a particular feature of the application may have been disclosed with respect to only one of several implementations, such feature may be combined with one or more other features of the other implementations as may be desired and/or advantageous for any given or particular application. Furthermore, to the extent that "includes", "having", "has", "with" and/or the like are used herein, such terms are intended to be inclusive in a manner similar to "comprising."

What is claimed is:

1. An arrangement for driving a rolling seal clamp of a polishing head, comprising:
   a body configured to be selectively pressurized; and
   a first alignment gear extending from an outer circumference of a housing of the polishing head configured for polishing a semiconductor wafer, the first alignment gear configured to be selectively mated with a first channel of a rolling seal clamp to which the body is attached, the first alignment gear mated with the first channel when the body is in a pressurized state and not mated with the first channel when the body is in a depressurized state.

2. The arrangement of claim 1, the first alignment gear configured to transfer rotational force through the rolling seal clamp to the body to drive the body.

3. The arrangement of claim 1, the first alignment gear extending from less than all of the outer circumference.

4. The arrangement of claim 1, the first alignment gear configured to transfer rotational force from the housing to the rolling seal clamp based upon the first alignment gear being mated with the first channel.

5. The arrangement of claim 1, the first alignment gear and the housing configured as a unibody.

6. The arrangement of claim 1, the first alignment gear attached to the housing as a separate component.

7. The arrangement of claim 1, comprising:
a second alignment gear extending from the outer circumference of the housing, the second alignment gear mated with a second channel of the rolling seal clamp when the body is in the pressurized state.

8. The arrangement of claim 1, comprising:
a pressure tube connected from the housing to the body and configured to supply pressure to the body.

9. The arrangement of claim 1, the polishing head configured to polish the semiconductor wafer during chemical mechanical polishing.

10. A method for driving a body of a polishing head using an alignment gear, comprising:
pressurizing the body of the polishing head, the pressurizing changing a relative position between a rolling seal clamp to which the body is attached and a housing of the polishing head, wherein a change in the relative position causes the alignment gear, extending from an outer circumference of the housing, to mate with a first channel of the rolling seal clamp;
transferring rotational force from the housing to the body through the alignment gear and the rolling seal clamp while the alignment gear is mated with the first channel of the rolling seal clamp; and
depressurizing the body of the polishing head to un-mate the alignment gear from the first channel of the rolling seal clamp.

11. The method of claim 10, the transferring rotational force comprising:
driving the body during chemical mechanical polishing of a semiconductor wafer held by the body.

12. The method of claim 10, comprising:
applying a force to a semiconductor wafer, held by the body, toward a polishing pad concurrently with the transferring rotational force from the housing to the body.

13. The method of claim 10, the pressurizing the body comprising:
providing pressure to the body via the housing to mate the alignment gear with the first channel.

14. The method of claim 10, wherein the alignment gear is in physical contact with a sidewall of the rolling seal clamp while the alignment gear is mated with the first channel.

15. A polishing head for polishing a semiconductor wafer, comprising:
a housing configured to supply pressure to a body of the polishing head through one or more pressure tubes connected from the housing to the body; and
an alignment gear extending from an outer circumference of the housing, the alignment gear configured to be selectively mated with a first channel of a rolling seal clamp to which the body is attached, the alignment gear mated with the first channel when the body is in a pressurized state and not mated with the first channel when the body is in a depressurized state.

16. The polishing head of claim 15, comprising:
a rolling seal configured to maintain the pressurized state of the body to secure the semiconductor wafer to the body during polishing.

17. The polishing head of claim 15, the body configured apply a force to the semiconductor wafer toward a polishing pad during polishing.

18. The polishing head of claim 15, the alignment gear extending from less than all of the outer circumference.

19. The polishing head of claim 15, comprising:
a retaining ring coupled to the rolling seal clamp, the retaining ring configured to stabilize the semiconductor wafer relative to the polishing head.

20. The polishing head of claim 15, the alignment gear positioned between a second channel of the housing and the first channel, a first connector situated within the first channel and configured to hold a first end of a pressure tube of the one or more pressure tubes, a second connector situated within the second channel and configured to hold a second end of the pressure tube, the pressure tube configured to supply pressure to the body to secure the semiconductor wafer to the body.

* * * * *